Mar. 3, 1925.
W. S. ESTES
1,528,014
SPROCKET FOR BULL WHEEL SETS
Filed Feb. 5, 1923
2 Sheets-Sheet 1
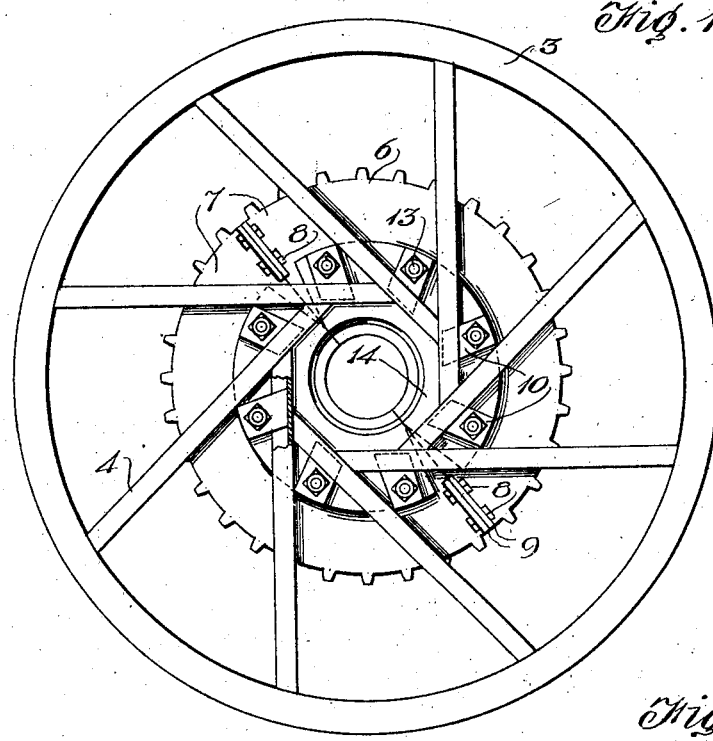
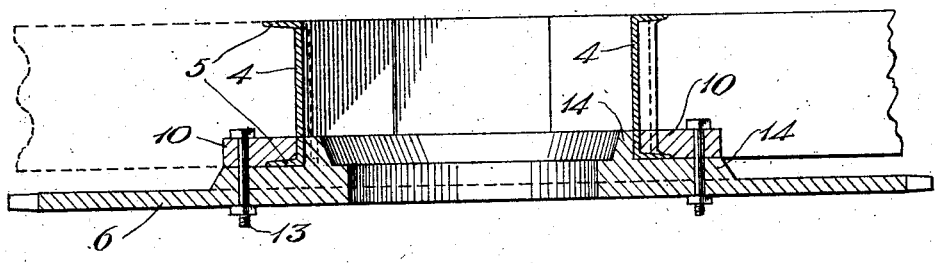
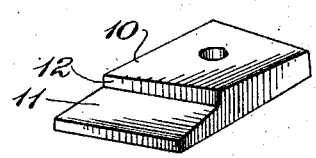
Inventor
WALKER S. ESTES.

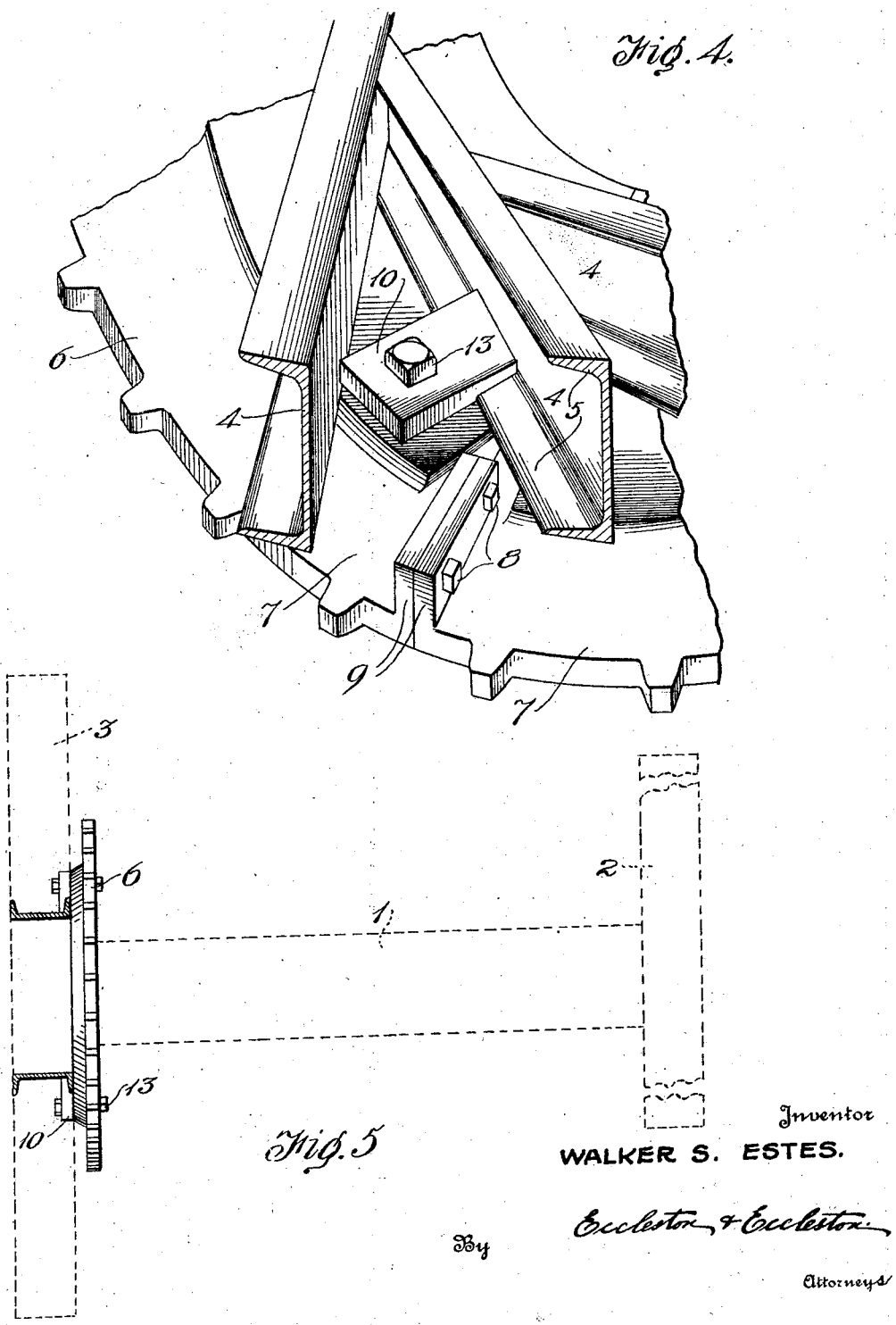

Patented Mar. 3, 1925.

1,528,014

UNITED STATES PATENT OFFICE.

WALKER S. ESTES, OF TULSA, OKLAHOMA.

SPROCKET FOR BULL-WHEEL SETS.

Application filed February 5, 1923. Serial No. 616,996.

*To all whom it may concern:*

Be it known that I, WALKER S. ESTES, a citizen of the United States, and a resident of Tulsa, in the county of Tulsa and State of Oklahoma, have invented certain new and useful Improvements in Sprockets for Bull-Wheel Sets, of which the following is a full, clear, and exact description.

The invention relates to improvements in sprockets for bull wheel sets, and one of the objects of the invention is to provide a split sprocket that may be quickly and easily applied to or removed from bull wheel sets of either the steel or wooden type, though the sprocket is more particularly adapted to use in connection with steel bull wheel sets.

Another object of the invention is to provide a sprocket of this character which is so mounted that it will apply the power to the spokes of the bull wheel rather than to the shaft carrying the bull wheel.

Further objects and advantages of the invention will be apparent to those skilled in the art from the following detailed description when taken in connection with the accompanying drawings, in which:

Figure 1 is an end elevation of a bull wheel with the improved sprocket mounted thereon.

Figure 2 is a vertical sectional view of the sprocket and attaching means, on an enlarged scale.

Figure 3 is a detail perspective view of one of the attaching lugs.

Figure 4 is a fragmentary perspective view of the spokes, sprockets and lugs, and clearly showing the manner of attaching the sprocket to the spokes of the bull wheel; and Figure 5 is a front elevation of a bull wheel set in outline, and showing the sprocket and attaching means in full lines; the purpose of this figure being merely to show the position of the sprocket on the bull wheel shaft.

Bull wheel sets used in oil field work were formerly operated almost entirely by stationary gas or steam engines, but in more recent years it has become the common practice to employ tractors, which are adapted to move from well to well, thus eliminating the expense of an engine for each well. The tractors transmit the power to the bull wheel sets by either rope or chain drive; and, of course, the present invention relates to sprockets for the chain drive.

Referring to the drawings in detail, numeral 1 indicates an ordinary steel bull wheel shaft, carrying the usual brake wheel 2, and steel bull wheel 3. These elements are indicated in outline in Figure 5, the purpose being to show the position of the sprocket on the shaft relative to the bull wheel and band wheel. The element 3 which I have termed a bull wheel is also known in the oil fields as a tug wheel.

It may be mentioned here that the sprocket is adapted for use in connection with any type of bull wheel, either steel or wood; but my invention is particularly adapted for use in connection with steel bull wheels, and consequently I have illustrated the sprocket as applied to such bull wheels. I will, therefore, first describe the sprocket in connection with steel bull wheel constructions, and later indicate in what manner the sprocket is adaptable to wooden bull wheels.

The bull wheel 3 may be of any preferred construction, and details of construction have, therefore, been omitted to a large extent. The spokes for the bull wheel are indicated by numeral 4, and, as clearly shown in the drawings, these spokes are ordinary steel channels, having the usual flanges 5 at the sides thereof. The channel spokes are shown as tangentially arranged, but it will be understood, of course, that they may be arranged radially or in any other preferred manner.

The novel features of the present invention relates to means for attaching a sprocket to a bull wheel; and the construction of the sprocket and the attaching means will now be described in detail.

The sprocket is indicated generally by the numeral 6, and, as clearly shown in the drawings, the sprocket is formed of two sections 7, 7, which are identical in construction. By forming the sprocket in two sections it may be readily applied to or removed from a bull wheel, and the necessity of having a sprocket on each bull wheel is thus eliminated.

The sprocket sections are positioned around the bull wheel shaft, and are then secured together in any preferred manner, as by means of bolts 8 passing through lateral flanges 9 formed on the sprocket sections. It is to be noted here that the sprocket is not clamped or otherwise rigidly fixed to the bull wheel shaft, as in previously known structures of this character. On the contrary, in the present invention the sprocket has no direct connection with the bull wheel shaft, but is connected to the spokes of the bull wheel, as will appear hereinafter. Of course, the sprocket is so designed that there will be a sufficiently tight fit between the sprocket and shaft as to prevent any excessive play between these parts.

In attaching the sprocket to the bull wheel spokes the sprocket is placed in a position abutting the spokes, and a plurality of securing lugs are then engaged with the spokes and attached to the sprocket. The securing lugs are indicated by numeral 10, and in the specific form illustrated herein a portion of the lugs is cut away, thereby forming a tapering portion 11 and a shoulder 12. The tapering portion 11 conforms substantially to the usual tapering form of the channel flanges 5. The lugs are mounted in place so that the tapering portions 11 engage the flanges 5, while the shoulders 12 engage over the edge of the flanges; and the lugs are then attached to the sprocket in any desired manner, as by means of bolts 13. The specific construction of the lugs is obvious from an inspection of the drawings, and, as illustrated therein, it is preferred that one end of the lugs extends down into one channel iron so as to engage with the base of the channel iron, while the other end of the lug extends to and engages the base of the next channel iron. By this construction the spokes are all tied together so that there is no undue strain on any particular spoke and power may be applied to rotate the bull wheel in either direction. It is not essential, of course, that the lug extend down into the channel to the base thereof, for the above mentioned functions could be accomplished by merely having one end of the lug engage the top of one of the channel flanges, while the other end of the lug engages the base of the next channel spoke.

I prefer to form the sprocket with a boss 14, which is adapted to engage one wall of the spokes, as clearly shown in Figures 1 and 2. Of course, the particular design of this boss may be varied to fit different types of bull wheels, and it is to be understood that the boss does not form an essential part of the invention, for it may be omitted entirely, if desired.

I have shown a lug for each spoke, but obviously this is not necessary; and it is to be clearly understood that the invention is not to be limited to any specific form of lug, as my invention contemplates broadly any means for attaching the sprocket to the bull wheel.

In the case of wooden bull wheels the sprockets now known have the interior of the hub of polygonal shape, so that when the sprocket is clamped onto the wooden shaft the metal bites into the wood, thus holding the sprocket fixed relative to the shaft. Obviously, this is a very crude and unsatisfactory manner of mounting the sprocket on the shaft. As stated hereinbefore, the present invention is particularly adapted to steel bull wheels; but it is also obviously adapted to wooden bull wheels.

To apply the sprocket to wooden bull wheels only a slight variation in the shape of the lugs is necessary. In the case of wooden spokes there would be no flange for the lugs to engage over, and hence the lugs would be provided with some means, such as a hooked end, to engage over the edge of the spokes to prevent lateral movement of the sprocket. Of course, any equivalent means, such as frictional engagement between the lugs and wooden spokes, could be employed to prevent lateral movement of the sprocket. In the case of wooden bull wheels each lug will preferably extend between and engage two of the wooden spokes in the same manner and for the same reason as previously described in connection with steel bull wheels. The sprockets and lugs may be made of any desired metal, such as cast steel, cast iron, etc., and the size of the sprocket sections and the size and shape of the lugs will be varied to meet varying conditions in the field.

From the foregoing description it will be apparent that I have devised a sprocket for bull wheels which may be quickly and easily applied to or removed from bull wheel constructions of either the steel or wooden type; that when my sprocket is attached in the manner described it is impossible for the sprocket to become accidentally detached, or for any relative movement to occur between the bull wheel and the sprocket; that the sprocket is mounted directly on the bull wheel spokes instead of being mounted on the bull wheel shaft as in previously known structures; and that the sprocket can be applied in the field and be carried from well to well, thereby eliminating the necessity of a sprocket for each well.

In accordance with the patent statutes, I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. A bull wheel set including a shaft, a bull wheel and a brake wheel mounted on said shaft, a sprocket surrounding the shaft but independent thereof and directly connected to the spokes of the bull wheel, channel irons forming the spokes of the bull wheel, and lugs engaging over the flange of said channel irons and attached to the sprocket.

2. A bull wheel set including a shaft, a bull wheel and a brake wheel mounted on said shaft, a sprocket surrounding the shaft but independent thereof, channel irons forming the spokes of the bull wheel, lugs engaging over the flange of one channel iron and engaging the base of an adjacent channel iron, and means for attaching the lugs to the sprocket.

3. A bull wheel set including a shaft, a bull wheel and a brake wheel mounted on said shaft, channel irons forming the spokes of the bull wheel, a sprocket surrounding the shaft but independent thereof, spacer lugs engaging over the flange of one channel iron and spanning the space between two adjacent channel irons, said lugs being detachably mounted on the sprocket.

4. A bull wheel set including a shaft, a bull wheel and a brake wheel mounted on said shaft, channel irons forming the spokes of the bull wheel, a sprocket surrounding the shaft but independent thereof, lugs engaging the base of two adjacent channel irons, and means for detachably mounting the lugs on the sprocket.

5. A steel bull wheel construction, channel irons forming the spokes of said bull wheel, a sprocket, and lugs engaging over the flanges of said channel irons and attached to the sprocket.

6. A steel bull wheel construction, channel irons forming the spokes of said bull wheel, a sprocket, lugs engaging the flange of one channel iron and engaging the base of an adjacent channel iron, and means for attaching the lugs to the sprocket.

7. A steel bull wheel construction, channel irons forming the spokes of the bull wheel, a sprocket, lugs engaging over the flange of one channel iron and spanning the space between two adjacent channel irons, said lugs being detachably mounted on the sprocket.

8. A steel bull wheel construction, channel irons forming the spokes of the bull wheel, a sprocket formed of two or more sections, means for uniting the sections, lugs engaging the base of two adjacent channel irons, and means for detachably mounting the lugs on the sprocket.

WALKER S. ESTES.